Oct. 20, 1931.  S. W. SPARKS  1,828,478
GATE VALVE AND METHOD OF MAKING SAME
Original Filed May 19, 1925  7 Sheets-Sheet 3

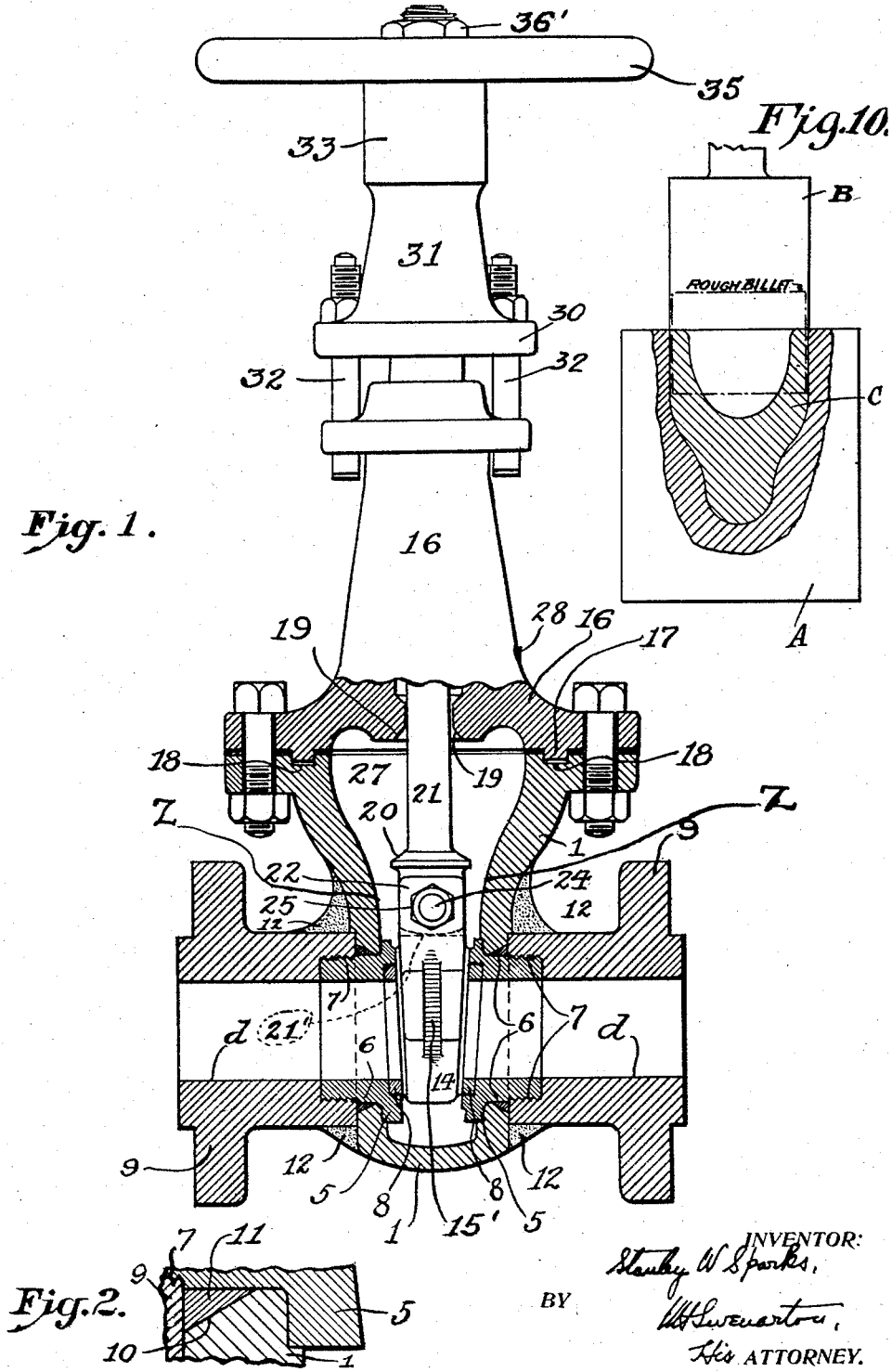

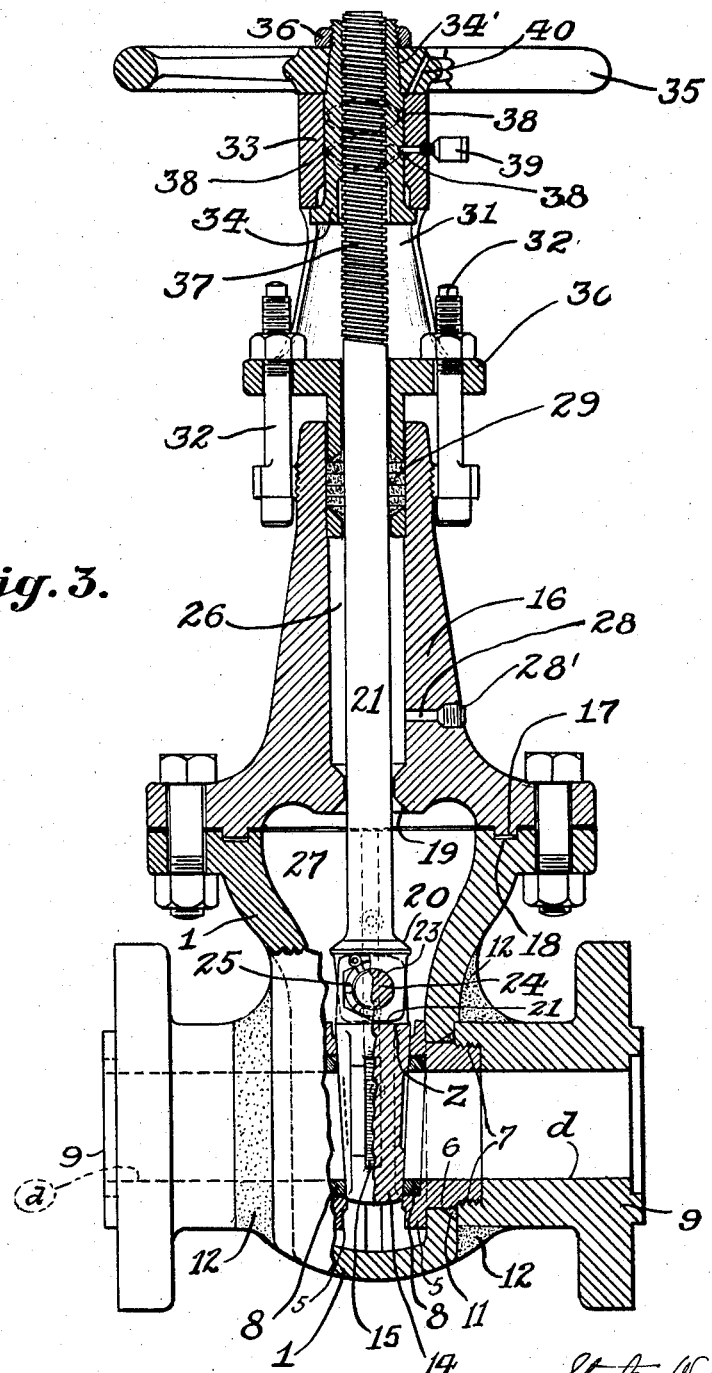

INVENTOR:
Stanley W. Sparks.
BY
W. H. Swenarton,
His ATTORNEY.

Oct. 20, 1931.  S. W. SPARKS  1,828,478
GATE VALVE AND METHOD OF MAKING SAME
Original Filed May 19, 1925  7 Sheets-Sheet 4
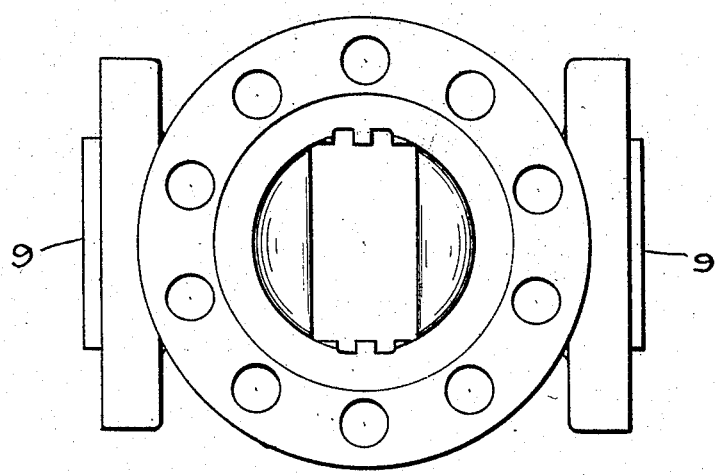
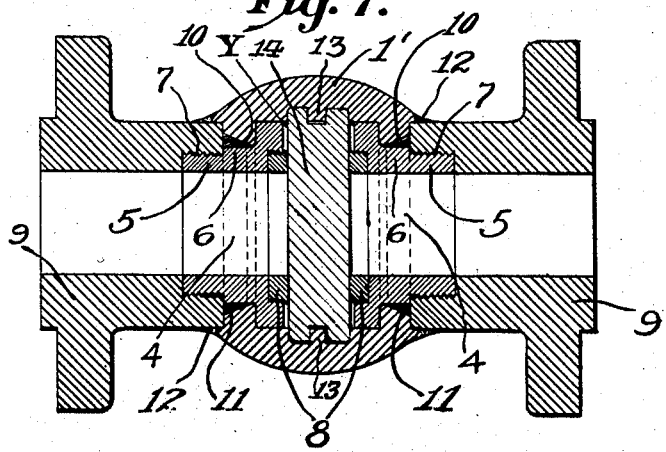
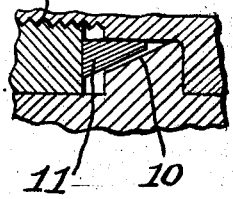
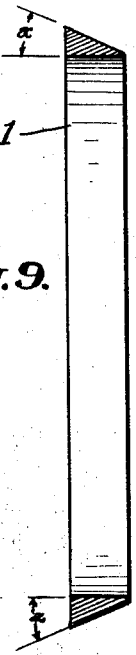
INVENTOR:
Stanley W. Sparks,
BY
His ATTORNEY.

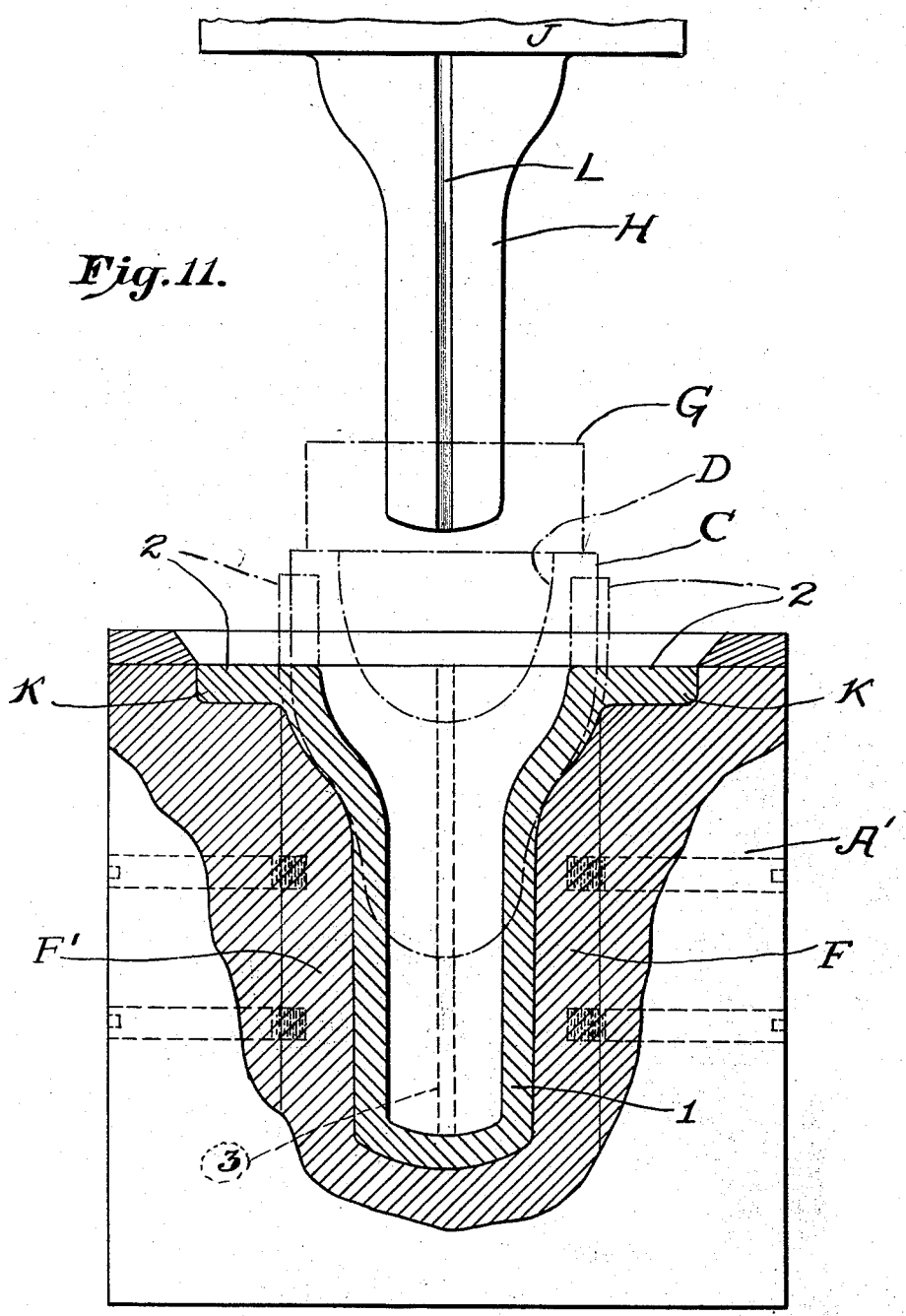

Oct. 20, 1931.   S. W. SPARKS   1,828,478
GATE VALVE AND METHOD OF MAKING SAME
Original Filed May 19, 1925   7 Sheets-Sheet 7
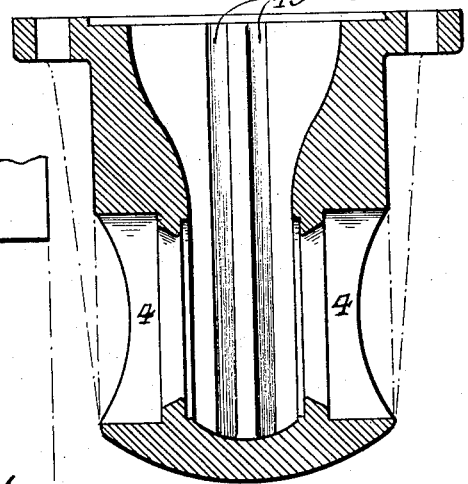
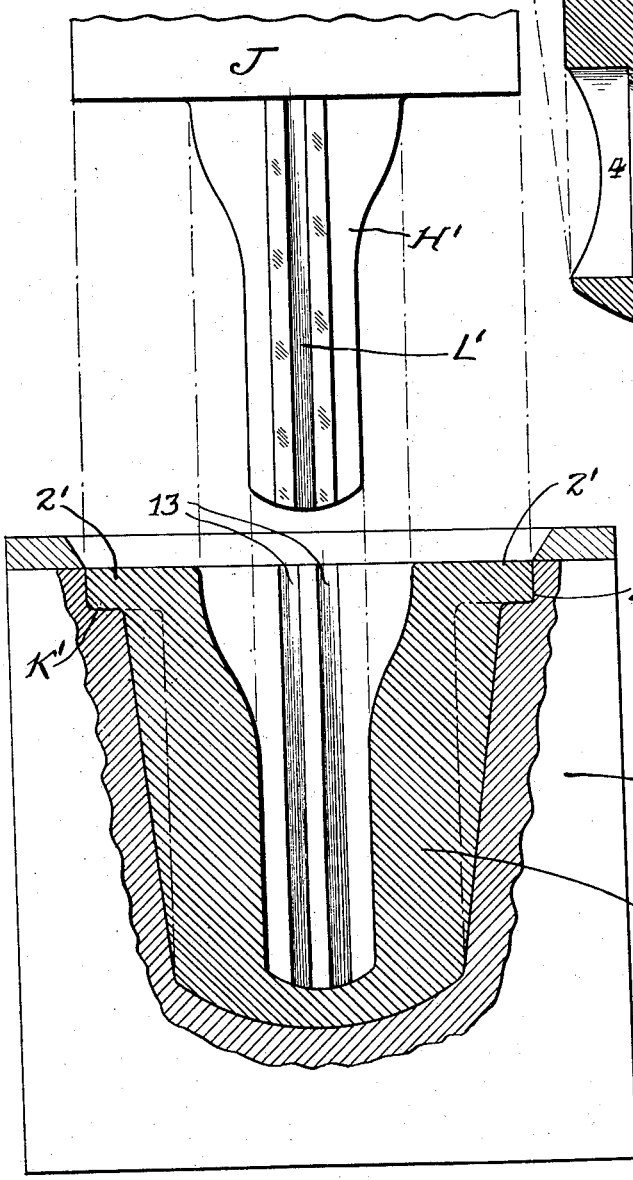
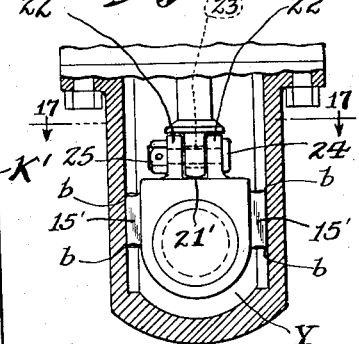
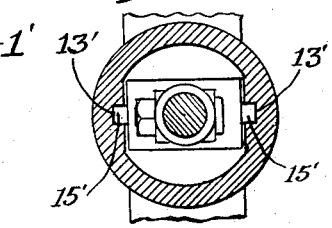
INVENTOR:
Stanley W. Sparks,
BY
His ATTORNEY.

Patented Oct. 20, 1931

1,828,478

UNITED STATES PATENT OFFICE

STANLEY W. SPARKS, OF SUMMIT, NEW JERSEY, ASSIGNOR TO THE COLUMBUS MACHINE COMPANY, OF COLUMBUS, OHIO, A CORPORATION OF OHIO

GATE VALVE AND METHOD OF MAKING SAME

Application filed May 19, 1925, Serial No. 31,289. Renewed July 6, 1931.

This invention relates to the manufacture of gate valve bodies and has for its particular objects the expeditious and economical manufacture of valves that are by virtue of their construction and shape peculiarly adapted for operations under high temperature and high pressure conditions, being especially useful for employment in oil cracking operations and superheated steam lines and remarkably efficient in operation, durable and highly resistant to distortion under the conditions of operation found in large oil refineries and high pressure power plants.

My invention is set forth in detail in the following description and drawings forming a part thereof in which Figure 1 is a vertical section partially in elevation of a high-pressure-high-temperature valve made in accordance with my invention, the body thereof being oblong-cylindrical in shape;

Fig. 2 is a fragmentary detail section showing the manner of assembly of the hubs to the valve body;

Fig. 3 is a vertical section partially in elevation of the valve shown in Fig. 1, the gate being shown in a closed position;

Fig. 5 is a side elevation and Fig. 6 is a plan view thereof;

Fig. 7 is a longitudinal horizontal section on line 7—7 of Fig. 4;

Fig. 8 is a fragmentary detail section of the valve shown in Fig. 4 corresponding to Fig. 2 and Fig. 9 is a vertical section of the sealing rings employed in either of the valves shown in Figs. 1 or 4.

Fig. 10 is a vertical section partially in elevation illustrating the first or pre-piercing stage of manufacture of a valve of the type of valve body shown in Figs. 1 or 4;

Fig. 11 is a vertical section partially in elevation illustrating the second stage of manufacture of a valve body shown in Fig. 1;

Fig. 14 is a vertical section partially in elevation of the second stage of manufacture of a cylindrical valve body of the type shown in Fig. 4 and Fig. 15 is a vertical section of the valve body so produced.

Fig. 16 is a fragmentary section, reduced in size, of a modification and Fig. 17 is a horizontal section on the line 17—17 of Fig. 16.

Figure 4:
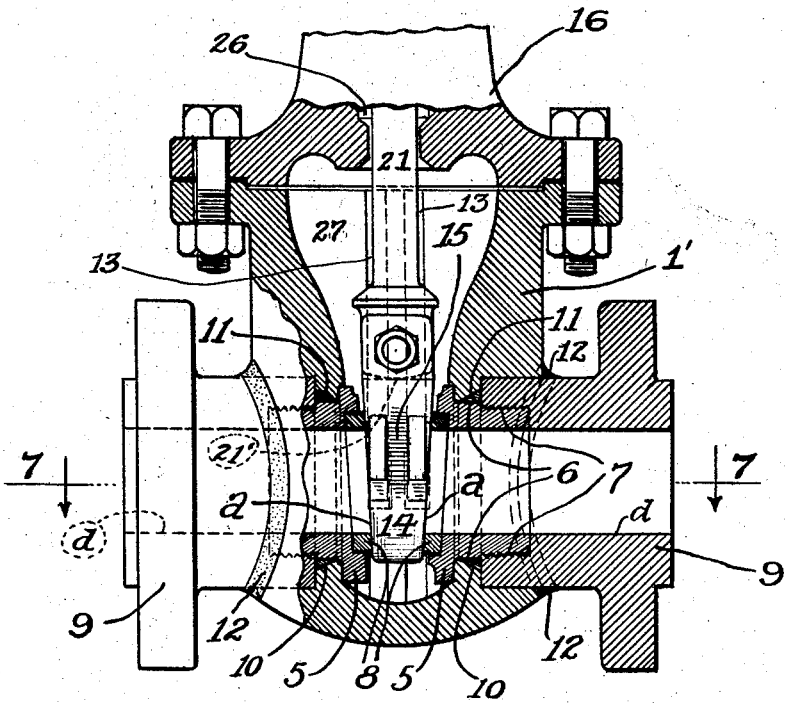
Fig. 4 is a fragmentary vertical section, partially in elevation of a modified form of body for a valve of the type shown in Figs. 1 and 3, such body being essentially cylindrical in external configuration.
Figure 5:
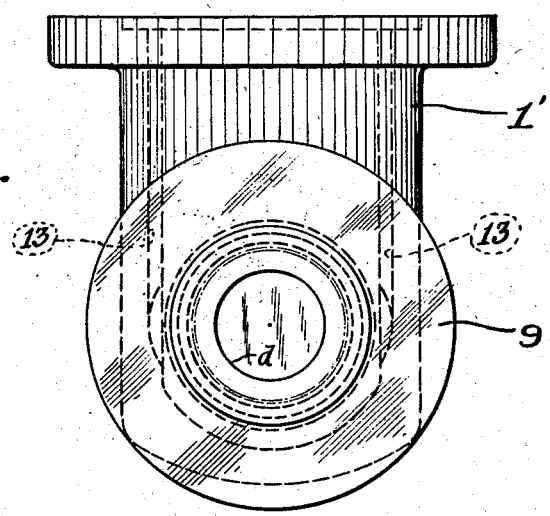

Referring to the drawings and the valve construction and method of manufacture of valve bodies as illustrated therein, the oblong-cylindrical and the cylindrical valve bodies illustrated in both Figs. 1 to 3 and in Figs. 4 to 7 respectively, are preferably formed by what is termed the extrusion method i. e. a rough billet of desired size and shape is first heated to a forging temperature of about 1700° to 1800° F. and then, if the same is of large size, such as used for the manufacture of large valve bodies, it is subjected in a die A to a pre-piercing operation of a semi-piercing plunger B which serves to not only form the billet, such as represented by the reference letter C, of a desired external shape, but also pierces a cavity or chamber D therein, thus facilitating the forging of the same in the subsequent extrusion stage.

In the manufacture of bodies for small valves for example, valve bodies for 6" lines this pre-piercing operation can be dispensed with as the thickness of the metal is not too great to permit to the direct extrusion of the valve body from an un-pierced billet. The pre-pierced billet or a small un-pierced billet is heated to an extrusion temperature (about 2400° to 2600° F.) and is then introduced either into a die A' (Fig. 11) or a die A'' (Fig. 14) of a hydraulic press or of a toggle press with slow action. Said die A' is bored to correspond to the desired outside cylindrical diameter of the body of an oblong cylindrical valve and counter-bored at the top to receive the enlarged portion of the shank of a plunger H. Lateral pad members F, F' are fitted within the die as shown to form the flattened walls of the body section. In the die A" which is employed for forging the cylindrical body valve shown in Figs. 4 to 7, 14 and 15, these pads are, of course, omitted.

Whichever form of body is desired, the actual operations during the forging of large valve bodies are the same, to wit: after the insertion of the heated billet into the upper end of either the die A' or A", a cold steel plug G, the bottom of which conforms to cavity D produced in the pre-piercing operation, is applied to the top of the pre-pierced billet and the plunger H or H' of the press is then forced down on the top of such cold block in order to force the heated billet into the bottom of the die. Thereupon the cold die block is quickly removed and the plunger is allowed to complete its downward stroke, which operation extrudes the hot metal up and around the same, forming inside body walls of desired configuration. As the plunger approaches the end of its stroke, the enlarged fillets between the plunger proper and the collar J will engage with the shell of the extruded body 1 or 1' and turn flanges 2 or 2' into the recessed portions K or K' of the die block while simultaneously the trimming thereof is accomplished.

The valve body 1 or 1' so formed is then removed from the die, subjected to the customary heat treatment and is then ready for the machining operation.

As shown, the plungers H or H' are provided with slots L or L' which during the extrusion operation, form ribs 3 or 13 in the valve body 1 or 1' respectively. In lieu of slots, the plunger employed may be provided with longitudinal ribs adapted to form key-ways such as illustrated in Figs. 16 and 17.

The forging obtained from the die A" is machined to the extent indicated by the broken lines in Fig. 14, it being preferable to forge the valve somewhat conical as indicated, and then machine the same.

My improved valve assembly is of the internal bushing type, the same being provided with removable valve seats and hub members.

Referring to the valve assembly shown in Figs. 4 to 9 inclusive, which for convenience I term the round valve assembly, the forged body 1', after the completion of the trimming operation, is submitted to a machining operation whereby lateral apertures 4 are bored which are adapted to receive flanged bushing members 5. The latter are provided with shoulders 6 and reduced threaded ends 7 and the external diameter of said bushings at the shoulders is slightly greater than the diameter of the apertures 4, thus admitting of the bushings being inserted from within the valve body through said apertures while the body is heated and expanded and then on cooling affording a tight joint as a result of the body being thus shrunk around said shoulders.

The inner faces of the bushings are recessed and seat rings 8 are threaded thereinto and hub members 9, either flanged, as shown or of the screwed end type (not shown) are screwed onto the reduced ends 7 of said bushings.

Marginal recesses 10, triangular in section, are formed in the valve body around the apertures 4 and the same serve as seats for gaskets or sealing rings 11, also of triangular cross-section, said rings having an internal diameter substantially equal to the extreme external diameter of the shoulders 6 and the peripheral faces of said rings conforming in angularity to the inner faces of the recesses 10 engaged thereby when the hubs are assembled in said apertures 4. Fillet welds 12 serve to not only seal the joint between body 1 and the hub members when the same are assembled together, but also strengthen the body at vital and critical points thereof, besides materially improving the external appearance of the valve body, so that same closely approximates the appearance of a valve having hubs integral with the valve body.

The lateral vertical walls of the body are provided either with vertical guides 13 or (as shown in Figs. 16 and 17) with vertical keyways 13'. A gate member 14, oblong in cross-section and having machined valve faces $a$ and also machined vertical key-ways 15 (Fig. 7) or machined vertical guides 15', is mounted in the valve chamber Y and adapted to travel on said guides (Fig. 7), or in said key-ways (Fig. 16). The guides 15' are formed at their upper and lower ends to provide cutting edges $b$ which serve to scrape any deposited carbon out of the key-ways 13'. Said gate has machined valve faces which, when the gate is seated, engage the machined face of the seat rings 8 and close communication through the conduits $d$ of the opposing hub members. A flanged centrally apertured bonnet member 16, comprising part of a superstructure and which member and superstructure is essentially similar to that illustrated in Figs. 1 and 3 is bolted to the flanges on the body member and preferably suitable packing material is interposed in the joint therebetween. Said bonnet is provided with an annular sealing rib 17 which, when the valve is assembled, is adapted to project into and tightly fit in an annular recess 18 formed in the top of the valve body. A ground bevelled recess 19 is formed around the central aperture in said bonnet, the same serving as a seat for a bevelled ground collar 20 formed on the valve stem 21 immediately above the point where the latter is connected to the gate.

In order to afford a substantially universal joint between said gate and its stem, the gate member, which is preferably of forged steel, is provided with integral spaced wings 22, provided with transversely extending apertures 23, and between said wings the terminal tongue of the stem 21, which is provided with a rounded end, is secured by means of a bolt 24 and nut 25. The diameter of said apertures 23 is somewhat larger than the diameter of said bolt 24 and likewise the width of said tongue is somewhat less than the spacing between the wings 22, with the consequence that such connection serves as a universal joint, as it were. Furthermore, such connection admits of a direct contact between the rocker or rounded end 21' of the valve stem and a shoulder Z of said gate, thereby relieving the bolt or pin 24 from excessive strains during the closing of said gate, as the apertures 23 are sufficiently large to prevent the said bolt contacting with the upper portions thereof during the closing of said gate.

The said bonnet 16 is provided with a condensing chamber which is circular in cross-section as designated by the reference numeral 26, that is adapted to form an extension of the radiating chamber 27 in the upper portion of the body, and as shown, said bonnet is preferably of a truncated cone-like configuration and relatively long with respect to its width. A plug 28' permits of relieving the pressure when desired through the duct 28.

Said bonnet is provided with a stuffing-box 29 within which is secured a gland 30 that is connected to a yoke member 31 by means of bolts 32. Said yoke is threaded upon the upper end of said bonnet in the manner shown and is provided at its upper end with a sleeve portion 33 which is adapted to receive a rotatable bushing 34. The latter has a tapered hexagon section on its upper end which is designated by the reference numeral 34', on which is tightly secured a hand wheel 35 by means of a nut 36. Said bushing is provided with an internal thread and is adapted to engage the threads 37 on the upper portion of the stem 21 which travels to and fro in said bushing depending upon the direction of rotation of the hand wheel 35. As shown said bushing is provided with a shoulder or flanged portion at its lower end and this, together with the hand wheel 35 prevents the movement of said bushing vertically with respect to the yoke 31. Spiral oil grooves are provided on the exterior surface of said bushing, same being designated by the numeral 38 and the same are adapted to be lubricated by means of an oil cup 39. An oil duct 40 admits of the lubrication of the joint between the hand wheel and the upper end of the yoke.

Figure 12:
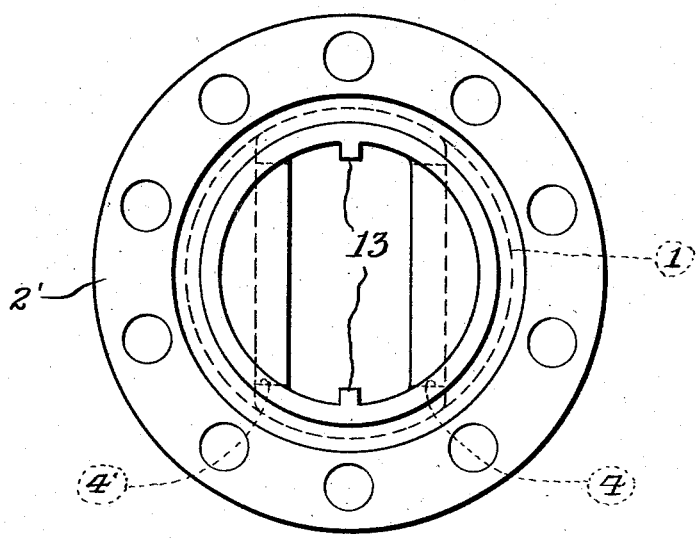
Fig. 12 is a plan view of the die with the forging therein shown in Fig. 11.
Figure 13:
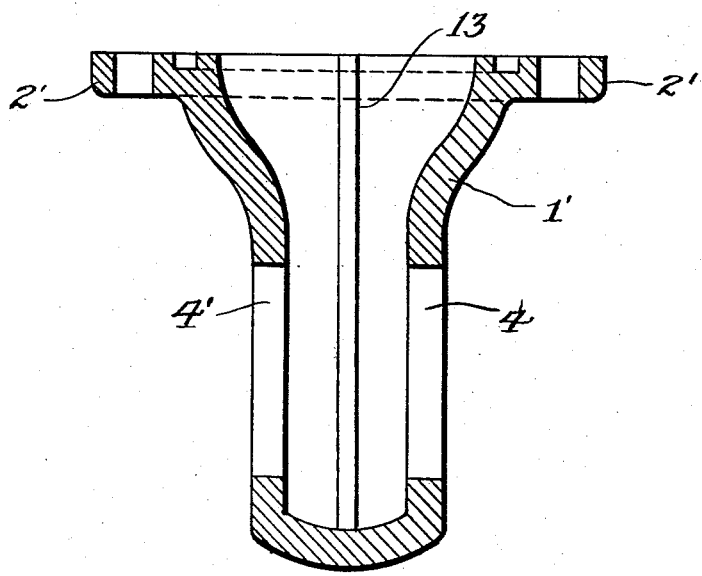
Fig. 13 is a vertical section of a forged valve body of the type shown in Fig. 1 as produced by the aforesaid operations.

Referring to the valve shown in Figs. 1 and 3 and 11 to 13 inclusive the same is in all essential respects similar to the above described valve illustrated in Figs. 4 to 7 inclusive, except the latter valve has a cylindrical body which is round in external cross-section and a valve chamber therein which is substantially oblong in cross-section, whereas the body shown in Figs. 1 and 3 and 11 to 13 inclusive has a valve which is of an oblong cylindrical shape externally and the valve chamber thereof is the same as the round body valve viz: of oblong cross-section. The assembly of the internal bushings of the valve seats and the hub members on the oblong cylindrical valve is essentially the same as above described in connection with the round body valve and accordingly, the description of the parts thereof and the manner of assembly is not repeated, it being understood that like reference numerals designate like parts in the drawings illustrated in these two types of valves.

The object of the fillet welds 12 is to more effectively retain fluid under high internal pressures against leakage through the joints between the hub face and the faced section of the valve body or through the parts of the internal bushing or through the sealing rings. Furthermore, such welds serve to materially strengthen the body of the valve at the points which are subject to the greatest strain either from the internal high pressures while operating under high temperatures or the mechanical strains due to the wedging force resulting from the closing of the tapered wedged gate upon its seats. These welds which can be advantageously made either by electric or by oxy-acetylene welding methods, also prevent the body side wall structures from deformation with permanent set.

The plunger H above described is substantially oblong in cross section at the bottom, the same forming a valve chamber substantially oblong in cross-section, as shown in Fig. 6, irrespective of whether the valve is externally of a round body type or the oblong cylindrical type, and the top section of such plunger is substantially cylindrical with two flattened sections on each side which form pads on the insides of the body into which are either machined or extruded key-ways or slots which are adapted to serve as guides for the gate in the manner above described.

The plug 28', which is preferably of forged or rolled steel and is adapted to withstand exceedingly high temperatures and pressures, serves not only to relieve accumulated pressures when desired, but also has a drain cock when it is necessary to repack the valve stem while the valve is open and without shutting off the lines governed thereby. In such a case while the collar 20 is in engagement with the seat 19, thereby relieving the interior of the bonnet from all pressures, the condensed liquid can be drawn off through said duct 28, provided, of course, the plug 28' has first been removed.

The upper end of the rotatable bushing 34 is provided, as stated, with an accurately machined hexagon section which is adapted to project into the central aperture of the hand wheel which is correspondingly tapered, the same being tightly held together by means of the adjusting nut 36, and thus the hand wheel will be prevented from excessive frictional engagement with the sleeve portion 33 of the yoke. During the closing operation of the valve, the thrust will come upon the lower terminal flange of the bushing 34 and during the opening of the valve, the thrust will come on the tapered shoulder of the bushing 34, thus relieving the sleeve 33 of the yoke from excessive thrusts and permitting of the free rotating movement of the hand wheel with its attached nut bushing.

Among the advantages possessed by the aforesaid forged steel valve having internal bushings, are the following:—

A forged valve can be made in the above described manner as an almost flawless forging, as by the use of forged steel and the submission of the forged billet of which the body is made to the compression action of the metal while maintained at the proper temperature, it is possible to cure such defects in the rolled and hammered billets and to produce a homogeneous mass of metal that is a distinct improvement over hammered or drop forge forgings. Furthermore, by the extrusion of forged steel bodies in dies by the employment of plungers, in the manner above described, it is possible to produce a very close body which can be subjected to tremendous pressures, namely, as high as 5200 lbs. without danger of leaks due to porosity or there being any leakage or damage due to distortion, deformation or disintegration of the metal, and furthermore, there is no danger of the metal in the structure being permanently deformed under excessive pressure tests. Again, by forging the billet by the extrusion process and by the heat treatment of the forging, it is possible to obtain a valve body having physical properties of the metal thereof materially improved.

Another important advantage of a forged valve as above described, is that it enables one to construct a valve by the assembly of the parts thereof, to wit: the internal bushings, sealing rings and hub members with the body in such a manner that the side walls of the valve body at the vital and critical parts thereof will, because of the fact that they are a built up or laminated section, return to their original shape without permanent set or deformation under pressure when high pressures and temperatures to which they have been subjected, are relieved.

The combination of the shapes of the valve body produces supporting arches Z at critical points in the valve where the internal pressures are the most effective and at which point any deformation of the structure would throw seats of the valve out of alignment with the gate.

A still further advantage of a valve having internal bushings, such as herein described, over a valve having integral hub members, such as might be formed from a solid billet, is that, by fitting internal seat carrying bushings in the manner to the flattened inside section of the valve, the faces of this bushing are allowed to be carried close to the center of the aperture within the body of the valve, thereby producing a very restricted pressure area against which the internal pressures can operate, thereby reducing the deformation area to a minimum, when operating at high temperatures with high internal pressures.

The conical shaped super-structure of my improved valve renders it possible to radiate a large amount of heat from within the valve body when the valve is operating either on super-heated steam or hot oil, and furthermore, this type of forged super-structure produces a very large and high condensing chamber which removes the gland and stuffing box to a point considerably distant from the heat zone.

The metal employed for the metal parts of my improved valve is preferably steel with the exception of the hand wheel which may be of heavy cast iron.

The gate member is preferably a solid steel forging, the stem is of rolled steel preferably having what is known as an acme thread and the hubs and internal bushings are also of forged steel as are the seat rings, though the latter may be of special metal. The bonnet, like the body, is preferably of extruded forged steel, while the stuffing box and the gland are of forged steel.

The term "valve chamber" as herein employed, refers to that portion of the chamber in the body which is below the top of the upper seat whereas the terms "radiating chamber" or "expansion chamber" as used with respect to the valve body is the chamber immediately above the valve chamber which is between the arched outwardly flaring walls Z and which chamber is of varying circular cross-section both internally and externally By the term "worked" I refer to the heating of metal until it becomes plastic and the extrusion thereof under high pressure to the desired shape.

This application is a continuation in part of applicant's co-pending application for valves #729,752, filed August 2, 1924.

Having thus described my invention, what I claim and desire to obtain by United States Letters Patent is:—

1. The method of making a forged steel valve which consists in subjecting a steel billet of the desired composition and of a thickness too great to admit of the extrusion of the same to the desired shape to a forging temperature and then preforming a cavity therein to admit of the thorough heating of the walls of said billet during the subsequent extrusion operation, then elevating the temperature to an extrusion point which is sufficient to render the metal plastic but insufficient to melt the same and extruding the desired valve body in a die block of a shape which is capable of producing the desired valve body while subjecting the same to high pressure from a die plunger member of a substantially rectangular cross-section adjacent its lower end, the entire shaping of the valve chamber and the external wall of the valve body proper being accomplished by a single stroke of said plunger.

2. The method of making a forged steel valve which consists in subjecting a steel billet of the desired composition and of a thickness too great to admit of the extrusion of the same to the desired shape to a forging temperature and then preforming a cavity therein to admit of the thorough heating of the walls of said billet during the subsequent extrusion operation, then elevating the temperature to an extrusion point which is sufficient to render the metal plastic but insufficient to melt the same and extruding the desired valve body in a die block of a shape which is capable of producing the desired valve body while subjecting the same to high pressure from a die plunger member of a substantially rectangular cross-section adjacent its lower end and simultaneously forming guides in the inner wall on opposite sides of the inner wall of said valve body adapted to co-operate with the gate member when introduced into said body, the entire shaping of the valve chamber and the external wall of the valve body proper being accomplished by a single stroke of said plunger.

3. The method of forming a forged valve body which consists in subjecting a steel billet, of a suitable thickness to admit of the successful extrusion thereof into a valve body of the desired shape, to an extrusion temperature sufficient to render the same plastic while confining the same in a die block of an internal shape corresponding to the desired external shape of the valve body, subjecting said heated metal to the action of a plunger die member forced thereinto under high pressure of a suitable configuration to form an oblong valve chamber in said valve body, removing the forging from the die block forming a lateral aperture in each of the two opposite sides at points adjacent the bottom of the body, inserting internal bushings into said apertures and tightly securing the same to said body and then applying hub members to each of said bushings.

4. The method of forming a forged valve body which consists in subjecting a steel billet, of a suitable thickness to admit of the successful extrusion thereof into a valve body of the desired shape, to an extrusion temperature sufficient to render the same plastic while confining the same in a die block of an internal shape corresponding to the desired external shape of the valve body, subjecting said heated metal to the action of a plunger die member forced thereinto under high pressure of a suitable configuration to form an oblong valve chamber in said valve body, removing the forging from the die block forming a lateral aperture in each of the two opposite sides at points adjacent the bottom of the body, inserting internal bushings into said apertures, tightly securing the same to said body and then applying hub members to each of said bushings and then butt welding the exterior of said hub members to the exterior of the valve body at the juncture thereof.

5. The method of making a forged steel valve body which consists in subjecting a substantially unformed, rough finished billet of a proper thickness to admit of the extrusion therein in a die to the desired shape, and while heated to an extrusion temperature which is sufficient to render the metal plastic but insufficient to melt the same, to the action of co-operating die members of a configuration adapted to form in a single operation a substantially complete valve body having a cylindrical-external shape and having at its lower portion an oblong internal shape.

6. The method of making a forged steel valve body which consists in subjecting a substantially unformed, rough finished billet of a proper thickness to admit of the extrusion thereof in a die to the desired shape and while heated to an extrusion temperature which is sufficient to render the metal plastic but insufficient to melt the same to the action of co-operating die members of a configuration adapted to form in a single operation a substantially complete valve body having an oblong cylindrical-external shape and having at its lower portion an oblong internal shape.

7. In a valve assembly, a valve body of the hollow forged type having forged pads or ribs to constitute a gateway, the said valve body having worked metal walls of homogeneous texture and a central valve chamber, the walls of the valve chamber thereof being of substantially the same thickness throughout, whereby said body is capable of withstanding extremely high pressures without permanent distortion, disintegration of the metal or leakage.

8. The method of making valve bodies of the class described which consists in forging a valve body, by extruding a substantially unformed billet, while heated to a plastic condition, and substantially completing its chamber structure during the forging operation.

9. The method of making valve bodies of the class described which consists in forging a valve body, by extruding a substantially unformed billet, while heated to a plastic condition, and simultaneously completing the contour of its chamber including the formation of stiffening elements.

10. The method of making valve bodies of the class described, which consists in piercing and forging a solid block to provide a valve body whose inner configuration is substantially completed during the forging operation, establishing fluid ways on the opposite side of such body subsequent to the forging operation, providing separately formed hub units, and securing them in fluid tight engagement with the valve body.

11. The method of making an extruded valve body, which comprises subjecting a metal blank of a cubical content sufficient to form the desired valve body, to an extrusion temperature sufficient to render the same plastic, then, while confining the same in a die of predetermined internal configuration adapted to externally shape the valve body, extruding the metal outwardly from said blank and around a forming ram member while forcing said ram into said plastic metal under high pressure and causing the extruded metal to flow into an enlarged cavity formed between said die and said ram member effecting the flaring of the outer end portion of the extruded metal and then, following the extrusion of said blank to the outermost limits of said cavities, effecting the gradual contraction in size of said cavity while causing the reversal of the movement of the metal in the extreme outer end of said cavity, while still exerting a high pressure upon said metal to form a flange on the body.

12. The method of making an extruded valve body, which comprises subjecting a metal blank, of a cubical content ample to form the desired valve body, to an extrusion temperature sufficient to render the same plastic, then, while confining the same in a die of a predetermined configuration adapted to externally shape the valve body, effecting the extrusion of the metal outwardly and around a forming ram member and substantially filling with portions of the extruded metal an enlarged cavity preliminarily formed between the relatively movable die and ram members and then effecting the gradual contraction of said cavities and the reversal of the movement of the metal in the extreme outer ends of said cavity whereby such terminal portion of the metal is upset and caused to assume the configuration of a terminal flange on the valve body so formed.

13. The method of making an extruded valve body, which comprises subjecting a metal blank, of cubical content ample to form the desired body, to an extrusion temperature sufficient to render the same plastic, then forcing the same through the open end of a die of a suitable configuration to externally form the desired valve body and into intimate contact with the bottom of said die, without effecting the substantial piercing and extrusion of said blank, then causing a ram element to penetrate said blank and to effect, by reaction against the walls of said die and the surface of said ram, the extrusion of portions of the metal outwardly around said ram member and into an enlarged cavity formed between said ram member and said die, and then effecting the contraction of said cavity while still exerting a high pressure on said metal whereby the extruded expanded portions of the billet are caused to be upset downwardly and against said die, thereby forming a terminal flange on the body so formed.

14. The method of making an extruded valve body, which comprises forming the body thereof by extruding a metal blank while heated to a plastic condition and simultaneously completing the contour of its valve chamber and the formation of a terminal flange thereon by an upsetting operation.

15. A valve assembly comprising an extruded valve body having a valve chamber, including opposing fluid ways extending through the lateral walls thereof, said valve body having an integral terminal flange, the said terminal flange and the walls of said valve chamber being of worked metal, said terminal flange having been formed by an upsetting operation.

Signed at New York, in the county and State of New York this 18th day of May, 1925.

STANLEY W. SPARKS.